(12) United States Patent
Chila et al.

(10) Patent No.: US 8,322,976 B2
(45) Date of Patent: Dec. 4, 2012

(54) HIGH TEMPERATURE SEAL FOR A TURBINE ENGINE

(75) Inventors: Ronald James Chila, Greer, SC (US); Kevin Weston McMahan, Greer, SC (US); Timur Repikov, Moscow (RU)

(73) Assignee: General Electric Company, Schenectady, NY (US)

( * ) Notice: Subject to any disclaimer, the term of this patent is extended or adjusted under 35 U.S.C. 154(b) by 1276 days.

(21) Appl. No.: 12/098,860

(22) Filed: Apr. 7, 2008

(65) Prior Publication Data

US 2009/0212504 A1 Aug. 27, 2009

(30) Foreign Application Priority Data

Feb. 27, 2008 (WO) ................ PCT/RU2008/000110

(51) Int. Cl.
*F04D 29/04* (2006.01)
(52) U.S. Cl. ........................................ 415/135
(58) Field of Classification Search .................. 415/135, 415/183, 232
See application file for complete search history.

(56) References Cited

U.S. PATENT DOCUMENTS

| 110,549 | A | | 12/1870 | Cheek |
| 227,148 | A | | 5/1880 | Clark |
| 654,257 | A | | 7/1900 | Hunter |
| 875,721 | A | | 1/1908 | Mertes |
| 1,609,952 | A | | 12/1926 | Ledwinka |
| 3,759,038 | A | * | 9/1973 | Scalzo et al. .................... 60/800 |
| 3,965,066 | A | | 6/1976 | Sterman et al. |
| 4,645,217 | A | | 2/1987 | Honeycutt, Jr. et al. |
| 4,785,623 | A | | 11/1988 | Reynolds |
| 5,014,917 | A | | 5/1991 | Sirocky et al. |
| 5,125,796 | A | | 6/1992 | Cromer |
| 5,127,799 | A | | 7/1992 | Berry |
| 5,265,412 | A | * | 11/1993 | Bagepalli et al. ............... 60/800 |
| 5,333,992 | A | | 8/1994 | Kane et al. |
| 5,398,496 | A | * | 3/1995 | Taylor et al. .................... 60/796 |
| 5,400,586 | A | | 3/1995 | Bagepalli et al. |
| 5,470,198 | A | | 11/1995 | Harrogate et al. |
| 5,630,700 | A | * | 5/1997 | Olsen et al. .................... 415/134 |
| 5,657,998 | A | | 8/1997 | Dinc et al. |

(Continued)

FOREIGN PATENT DOCUMENTS

EP 0875721 A1 1/1997

(Continued)

OTHER PUBLICATIONS

International Search Report and Written Opinion for International Application No. PCT/RU2008/000110; mailed Dec. 4, 2008, pp. 1-15.

(Continued)

*Primary Examiner* — Richard Edgar
(74) *Attorney, Agent, or Firm* — Cantor Colburn LLP

(57) ABSTRACT

A turbine includes a static member, a moveable member fluidly connected to the static member, and a flexible seal. The flexible seal includes a spring component having a base section mounted to one of the static member and the moveable member of the turbine and a plurality of biasing members. Each of the plurality of biasing members includes a first portion extending from the base section and a cantilevered portion. The flexible seal further includes a seal component provided on the cantilevered portion of each of the plurality of biasing members. The seal component is biased into contact with the other of the static member and the moveable member.

20 Claims, 5 Drawing Sheets

U.S. PATENT DOCUMENTS

| | | | |
|---|---|---|---|
| 6,547,257 B2 * | 4/2003 | Cromer | 415/135 |
| 6,637,752 B2 | 10/2003 | Aksit et al. | |
| 6,675,584 B1 | 1/2004 | Hollis et al. | |
| 6,860,108 B2 | 3/2005 | Soechting et al. | |
| 6,895,757 B2 | 5/2005 | Mitchell et al. | |
| 7,007,482 B2 | 3/2006 | Green et al. | |
| 7,080,513 B2 | 7/2006 | Reichert | |
| 7,524,167 B2 * | 4/2009 | Ohri et al. | 60/800 |
| 2006/0038358 A1 | 2/2006 | James | |
| 2006/0127219 A1 * | 6/2006 | Zborovsky | 415/229 |
| 2007/0284828 A1 | 12/2007 | Komukai et al. | |

FOREIGN PATENT DOCUMENTS

| | | | |
|---|---|---|---|
| EP | 0875721 A1 | 11/1998 | |
| EP | 0875721 B1 | 8/2002 | |
| EP | 1609952 A1 | 6/2005 | |
| EP | 1609952 A1 | 12/2005 | |
| EP | 1609952 B1 | 1/2008 | |
| GB | 2037380 A | * | 7/1980 |
| JP | 2002339706 A | 11/2002 | |
| JP | 2003083088 A | 3/2003 | |
| JP | 2004301115 A | 10/2004 | |
| JP | 2005337122 A | 12/2005 | |
| WO | 0227148 A1 | 4/2002 | |

OTHER PUBLICATIONS

PCT Search Report, PCT/RU2008/000110, Apr. 12, 2008.
JP Office Action dated Apr. 3, 2012 from corresponding Application No. 2010-548635 along with unofficial English translation.

* cited by examiner

HIGH TEMPERATURE SEAL FOR A TURBINE ENGINE

CROSS-REFERENCE TO RELATED PATENT APPLICATION

This application claims priority from PCT Application No. PCT/RU2008/000110, filed Feb. 27, 2008, the disclosure of which is incorporated herein in its entirety by reference.

BACKGROUND OF THE INVENTION

The present invention relates to the art of turbine engines and, more particularly, to a seal for turbine engine static members.

In a typical can-annular gas turbine engine, a plurality of combustors is arranged in an annular array about the engine. The combustors receive a supply of pressurized air from a compressor portion of the engine and a supply of fuel. The pressurized air and fuel are mixed to form a combustible air/fuel mixture. The air/fuel mixture is then ignited and combusted to form hot gases that are directed into a turbine portion of the engine. Thermal energy from the hot gases is converted to mechanical, rotational energy in the turbine engine.

The hot gases are passed from the combustor into the turbine through a transition duct or piece. In a typical gas turbine, an air duct that delivers cooling air from the compressor surrounds the transition piece. The combustion process results in a pressure differential between the hot gases passing into the turbine and the cooling air supplied by the compressor. Unless joints between the transition piece and the turbine are properly sealed, compressor air may pass into the turbine resulting in performance and efficiently losses for the engine. The seal must be able to withstand the high temperatures of the engine while at the same time remaining flexible so as to accommodate deflections and/or travel of the transition piece due to thermal expansion. As conventional seals do not "move" with the engine, gaps form that allow air from the compressor air to pass into a hot gas path portion of the turbine.

BRIEF DESCRIPTION OF THE INVENTION

In accordance with one aspect of the present invention, a turbine includes a static member, a moveable member fluidly connected to the static member, and a flexible seal. The flexible seal includes a spring component having a base section mounted to one of the static member and the moveable member of the turbine and a plurality of biasing members. Each of the plurality of biasing members includes a first portion extending from the base section, a cantilevered portion. The flexible seal further includes a seal element provided on the cantilevered portion of each of the plurality of biasing members. The seal element is biased into contact with the other of the static member and the moveable member.

In accordance with another aspect of the present invention, a flexible seal for a turbine includes a spring component having a base section mounted to one of a static member and a moveable member of the turbine. The flexible seal also includes a plurality of biasing members. Each of the plurality of biasing members includes a first portion extending from the base section, and a cantilevered portion. The flexible seal further includes a seal element provided on the cantilevered portion of the plurality of biasing members. The seal element is biased into contact with the other of the static member and the moveable member.

The above-described exemplary embodiments of the present invention provide a flexible seal that is configured to adapt to physical changes in a moveable member of a turbine engine as a result of thermal expansions and contractions. In any event, additional objects, features and advantages of the various aspects of the exemplary embodiments of the present invention will become more readily apparent from the following detailed description when taken in conjunction with the drawings wherein like reference numerals refer to corresponding parts in the several views.

DETAILED DESCRIPTION OF THE INVENTION

Figure 1:
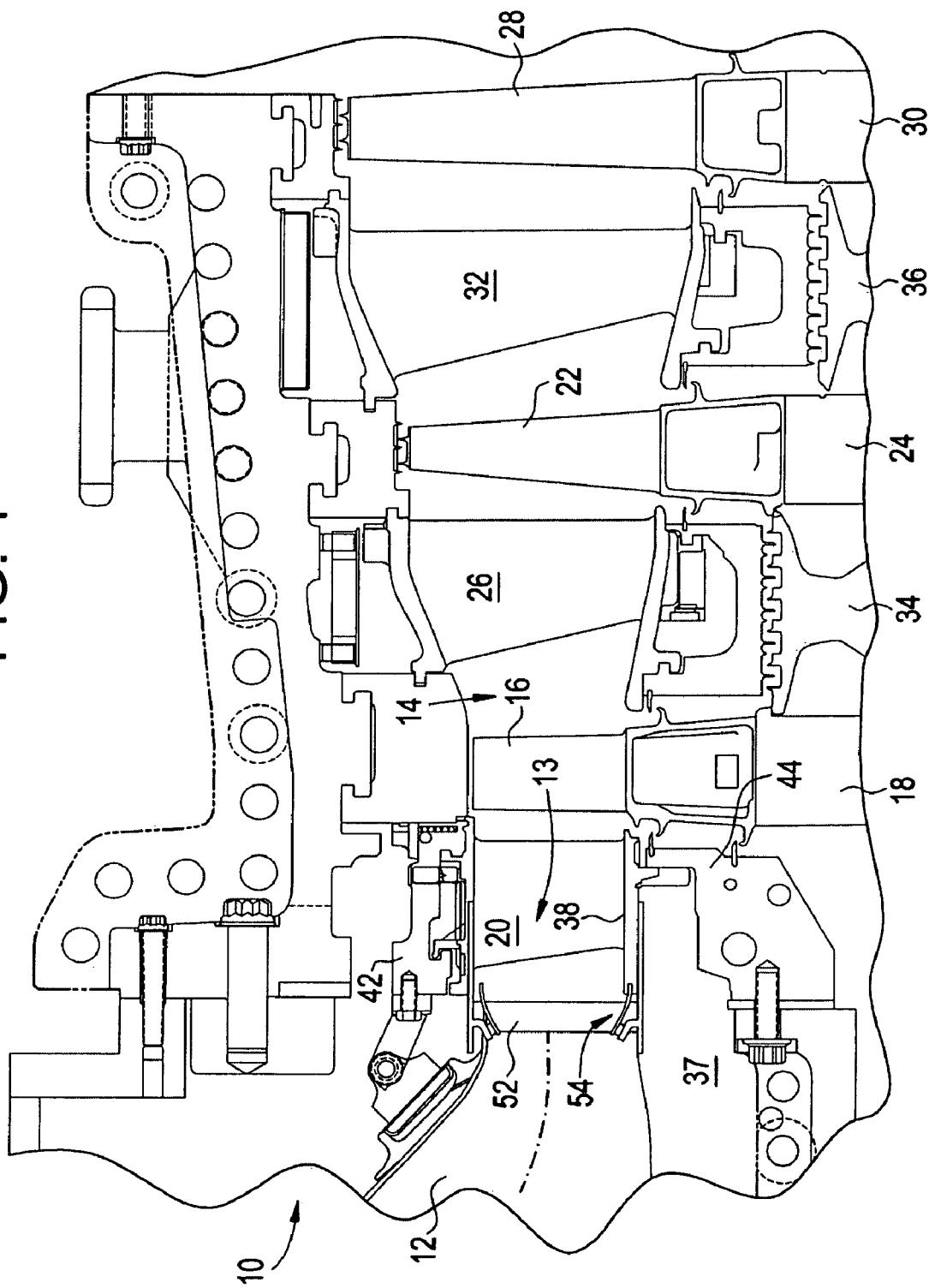
FIG. 1 is a partial schematic side elevational view of a portion of a turbine engine including a flexible seal member constructed in accordance with an exemplary embodiment of the present invention.
Figure 2:
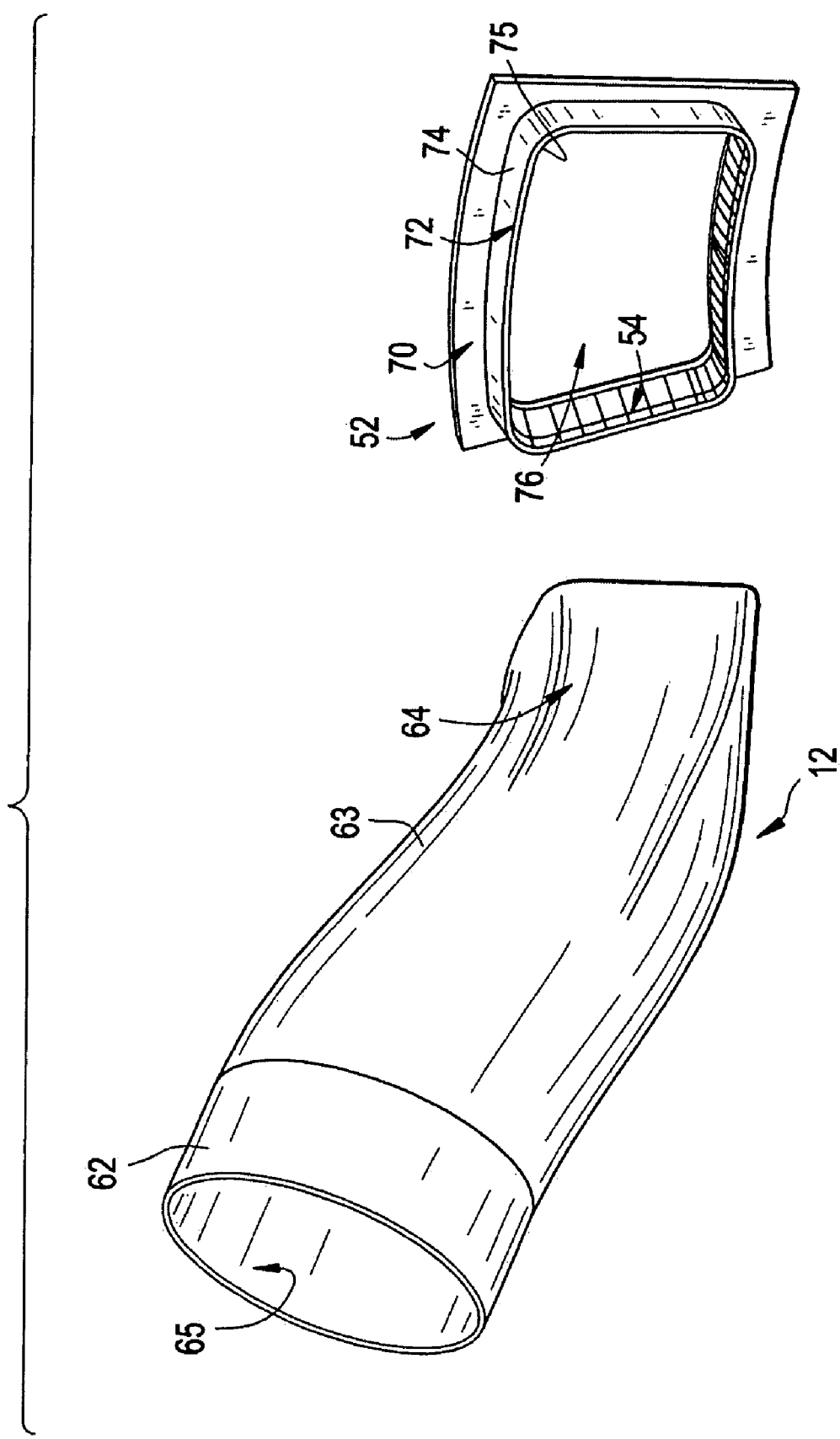
FIG. 2 is a perspective view of a casing member of the turbine engine of FIG. 1 including a flexible seal member constructed in accordance with an exemplary embodiment of the present invention.

With initial reference to FIGS. 1 and 2, there is illustrated a representative example of a turbine section of a gas turbine, generally indicated at 10. Turbine 10 receives hot gases of combustion from an annular array of combustors not shown, which transmit the hot gases through a transition duct or piece 12 that leads to a combustion-receiving zone 13. The combustion gases pass through transition piece 12 into combustion receiving zone 13 and flow along an annular hot gases path 14. A number of turbine stages (not separately labeled) are disposed along hot gas path 14. Each turbine stage includes a plurality of circumferentially spaced buckets mounted on and forming part of a turbine roller and a plurality of circumferentially spaced stator vanes forming an annular array of nozzles. In the embodiment shown, turbine 10 includes a first stage having a plurality of circumferentially spaced buckets 16 mounted on a first-stage roller wheel 18 and a plurality of circumferentially spaced-stator vanes 20. Similarly, turbine 10 includes a second stage having a plurality of buckets 22 mounted on a roller wheel 24 and a plurality circumferentially-spaced stator vanes 26. Also shown in FIG. 1, turbine 10 includes a third stage having a plurality of circumferentially spaced buckets 28 mounted on a third stage roller wheel 30 and a plurality of circumferentially spaced stator vanes 32. Of course, it will be appreciated that the number of stages present within turbine 10 can vary. It will also be appreciated that stated vanes 20, 26, and 32 are mounted on and fix to a turbine casing, while bucket 16, 22, and 28 and wheels 18, 24 and 30 form part of the turbine welder. In any event, turbine 10 includes a plurality of spaces 34 and 36 arranged between welder wheels 18, 24 and 30. Finally, it should be appreciated that the compressor discharge air is located in a region 37 disposed radially inward of the first turbine stage such that air within region 37 is at a higher pressure than the pressure of the hot gases following along hot gas path 14.

Referring to the first stage of turbine 10, stator vanes 20 forming the first-stage nozzles are disposed between inner and outer bands 38 and 40 respectively. The nozzles of the first stage are formed of a plurality of nozzle segments 41, each mounting one, preferably two, stator vanes that extend between inner and outer band portions 38 and 40 in an annular array of segments. In any event, it should be understood that the above-described structure does not form part of the present invention and is provided for the sake of clarity. The exemplary embodiment of the present invention is directed to an interface provided between a static member 52 and transition piece 12. More particularly, the exemplary embodiment of the present invention is directed to a flexible seal 54 arranged between static member 52 and transition piece 12.

As best shown in FIG. 2, transition piece 12 includes a first end portion 62 and a second end portion 63 that define an outer surface 64 and an inner surface 65. First end portion 62 connects to a combustion chamber portion (not shown) of turbine 10 while second end portion 63 is fluidly connected to static member 52. Static member 52 includes a main body portion 70 having a flange member 72. Flange member 72 includes a first surface 74 and a second surface 75 that define an opening 76 that leads into combustion gas receiving zone 13. With this arrangement, flexible seal 54 extends about opening 76 and, when brought into contact with second end portion 63, establishes a border between compressor discharge air and combustion gases.

Figure 3:
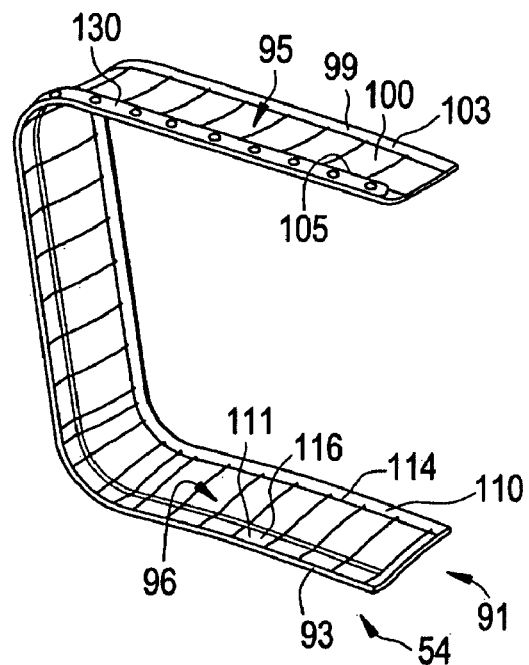
FIG. 3 is a partial perspective view of a flexible seal constructed in accordance with an exemplary embodiment of the present invention.
Figure 4:
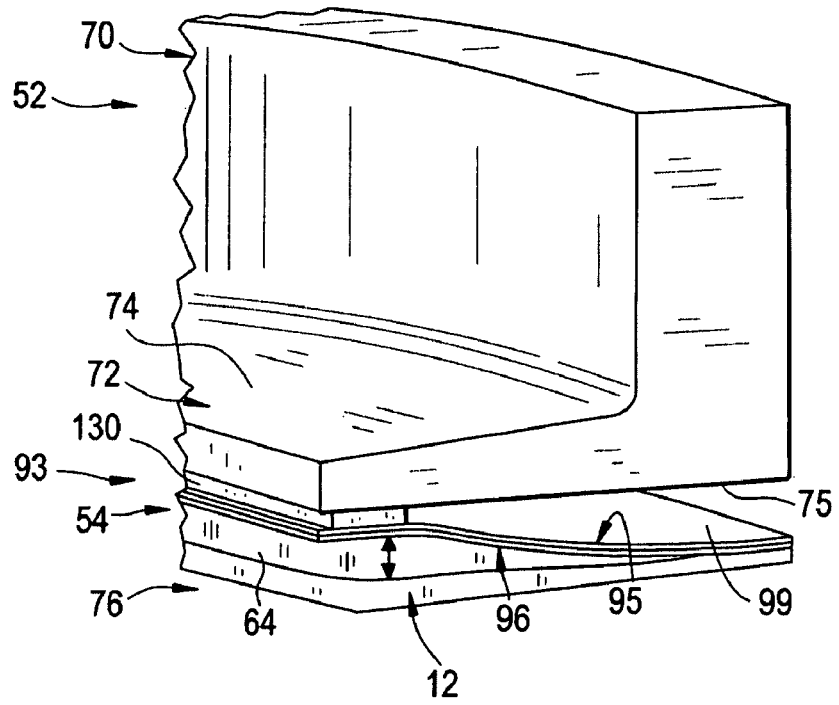
FIG. 4 is a partial cross-sectional side view of a flexible seal constructed in accordance with an exemplary embodiment of the invention mounted to a casing member.

As best shown in FIGS. 3 and 4, flexible seal 54 includes a leaf spring component 91 and a seal component 93. More specifically, leaf spring component 91 includes a first leaf spring component layer 95 joined to a second leaf spring component layer 96. In the exemplary embodiment shown, first and second leaf spring component layers 95 and 96 are welded to one to the other, but could also be joined through a variety of joining techniques including both chemical and mechanical bonding techniques. In any case, first and second leaf spring component layers 95 and 96 are laminated to form leaf spring component 91.

First leaf spring component layer 95 includes one or more laminated layers shaped (in cross-section) to match second surface 75 so as to seal any gaps between static structure 52 and transition piece 12. Towards that end, first leaf spring component layer 95 included a base section 99 and a plurality of biasing or leaf members, one of which is indicated at 100. More specifically, leaf members 100 are established by forming a series of narrow, shallow cuts (not separately labeled) in first leaf spring component layer 95. The series of narrow, shallow cuts form leaf members 100 on a first surface (not separately labeled) of first leaf spring component layer 95 and a single solid surface on an opposing surface (also not separately labeled) of first leaf spring component layer 95. Not only do the cuts provide flexibility, but gaps established by the cuts enable air to flow over portions of first leaf spring component layer 95 to provide a cooling effect. In addition to the cuts, holes could be provided in sections of first leaf spring component layer 95 in order to provide additional cooling. When first leaf spring component layer 95 is formed from multiple layers, the cuts are arranged in a staggered pattern such that outer spring member cover inner spring members (not shown). In any event, each leaf member 100 includes a first portion 103 that extends from base section 99 to a cantilevered portion 105. Likewise, second leaf spring component layer 96 includes a base section 110 and plurality of biasing or leaf members, one of which is indicated at 111. In a manner similar to that described above, each of the plurality of leaf members 111 includes a first portion 114 that extends from base section 110 to a cantilevered portion 116. With this configuration, leaf members 100 and 111 bias seal component 93 into a gap (not separately labeled) defined between transition piece 12 and static member 52. In addition to a biasing force provided by leaf members 100 and 111, seal component 93 is further loaded by a pressure differential that exists between hot gases passing into turbine 10 and cooling air supplied by compressor (not shown). Thus, the term "bias" should be understood to include a force provided by leaf members 100 and/or 111, a force resulting from a pressure differential or combinations thereof.

As shown in FIG. 3, seal component 93 shown in the exemplary embodiment as being formed from cloth or braided rope 130 that is secured to cantilevered portion 116 of each of the plurality of leaf members 100. With this arrangement, base section 99 is secured to second end portion 63 of transition piece 12 such that leaf members 100 and 111 bias braided rope 130 into contact with second surface 75 of flange member 72. Base section 99 is fixedly secured to second end portion 63 of transition duct 12. More specifically, base section 99 is secured to second end portion 63 by metallurgical bond such as a plurality of welds. Of course, it should be understood that various other bonding techniques could be employed such as brazing. Also, chemical-bonding techniques such as, the use of strong epoxies could also be employed. In any case, plurality of leaf members 100 and 111 are each separately biased towards second surface 75 of flange member 72 in order to ensure that braided rope 130 is in complete contact with static member 52. That is, by using a plurality of discreet leaf members' inconsistencies that may be present in second surface 75 accommodated. In any case, it should be understood that seal 95 is hard mounted to one of static member 52 and transition piece 12 and biased against the other of static member 52 and transition piece 12.

Figure 5:
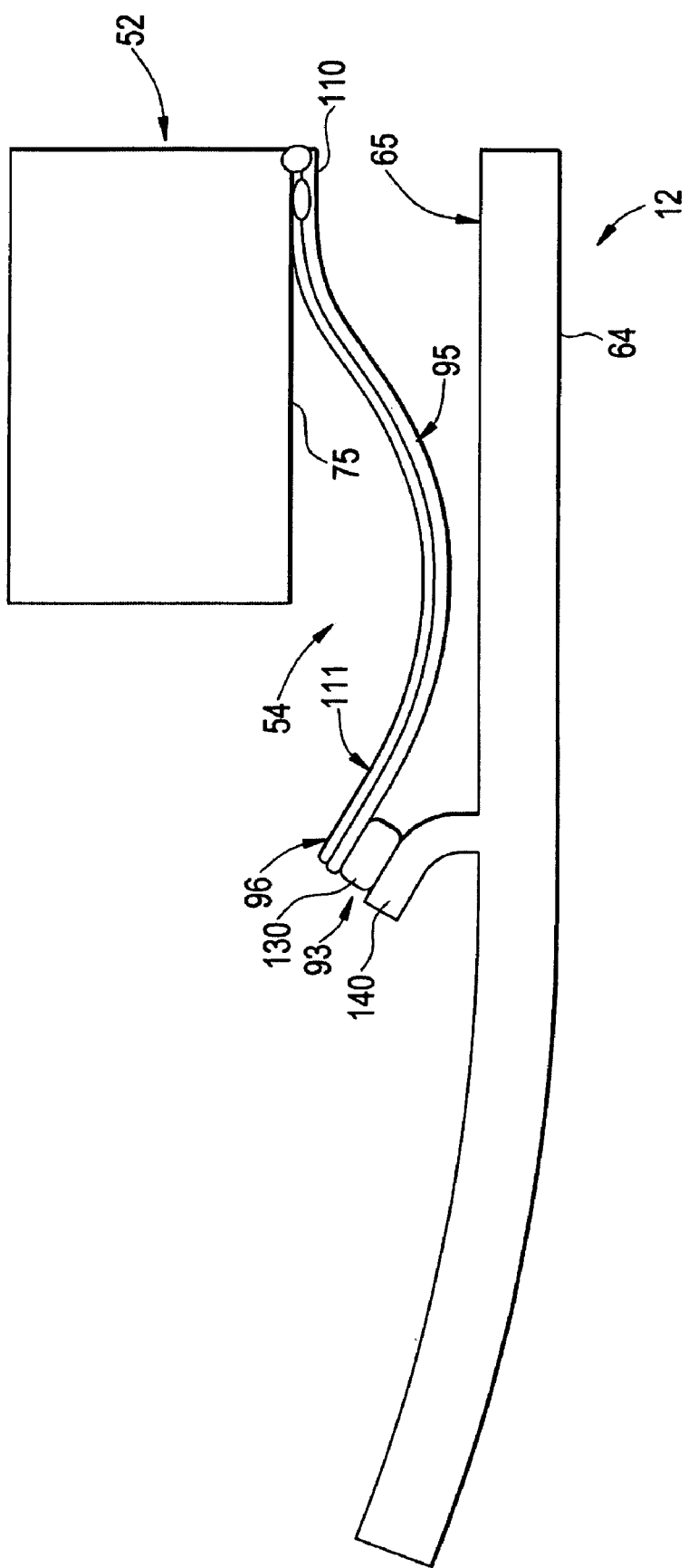
FIG. 5 is a partial cross-sectional view of a flexible seal constructed in accordance with an exemplary embodiment interposed between a transition duct and a casing member.

In accordance to another aspect of the invention, illustrated in FIG. 5 base section 110 is mounted to second surface 75 of static member 52. In addition, FIG. 5 illustrates an extended member or element 140 arranged on outer surface 64 of transition piece 12. In the exemplary embodiment shown, extended element 140 takes the form of a hook that is positioned adjacent second end portion 63 and extends circumferentially about outer surface 64. With this arrangement, plurality of leaf members 111 urge braided rope member 130 into contact with extended element 140 to ensure that hot gases and/or combustion discharge air remains within turbine 10.

Figure 6:
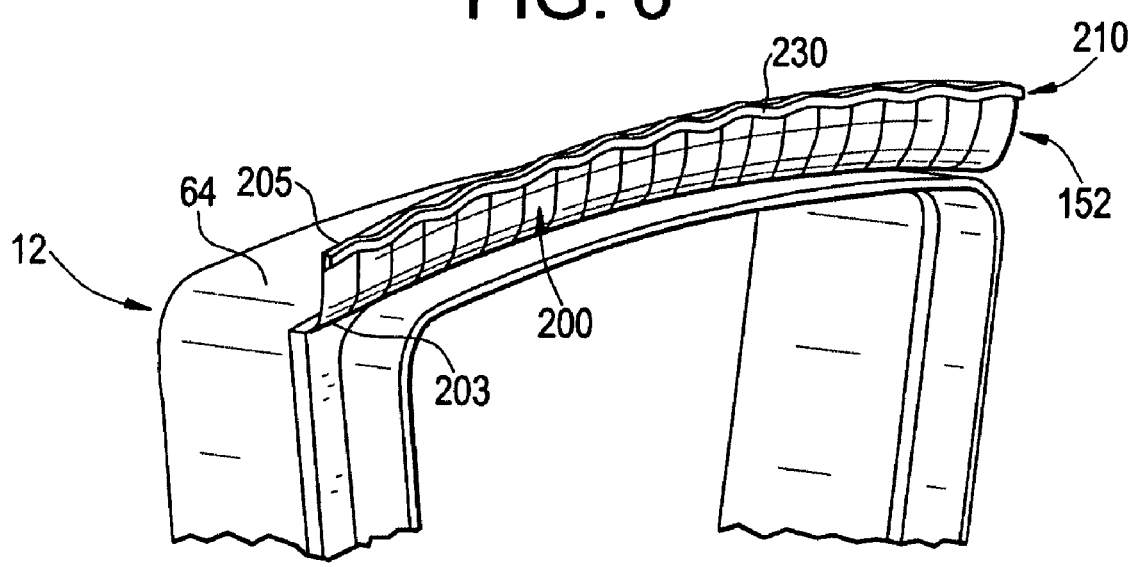
FIG. 6 is a partial perspective view of a flexible seal constructed in accordance with an exemplary embodiment of the present invention mounted to a transition duct.
Figure 7:
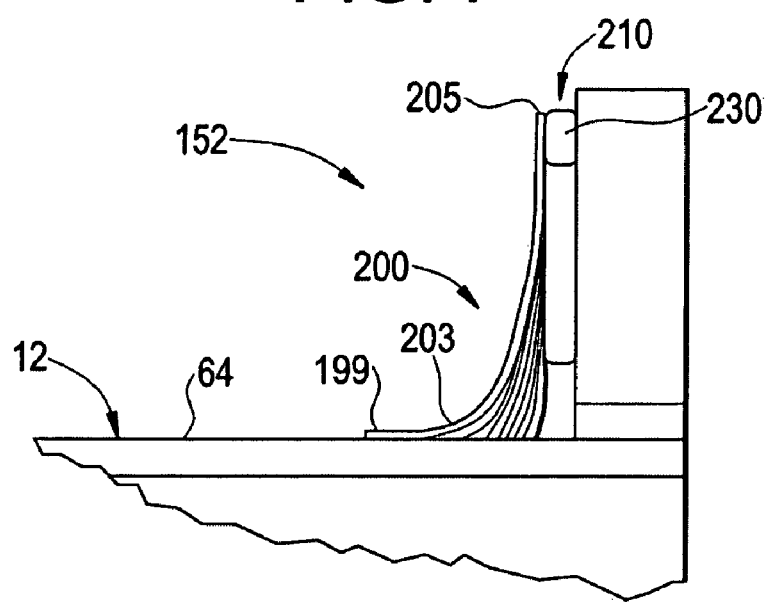
FIG. 7 is a partial cross-sectional side view of the flexible seal member of FIG. 6.

Reference will now be made to FIGS. 6 and 7 in describing a further aspect of the present invention. As shown, a flexible seal 152 is mounted to outer surface 64 of transition duct 12. Flexible seal 152 is a single layer leaf spring component including a base section 199 having a plurality of leaf members 200. Each of the plurality leaf members 200 includes a first end section 203 that extends from base section 199 to a second, cantilevered end section 205 that is provided with a seal element 210. Seal element 210, in the exemplary embodiment shown, is a braided rope or sealing member 230 that is positioned on the plurality of leaf members 200 adjacent cantilevered end portion 205. In accordance with the exemplary embodiment shown, braided rope 230 is arranged in a zigzag configuration across the plurality of leaf members 200. The zigzag configuration allows braided rope 230 to expand and contract in response to physical changes in transition piece 12 resulting from extensions and contractions attributed to heat generated from the operation of turbine 10.

At this point, it should be appreciated that the flexible seal constructed according to exemplary embodiments of the present invention provides a robust sealing arrangement for sealing between a static portion and a moveable portion of a turbine engine. That is, the flexible seal is designed to accommodate various inconsistencies and changes that occur between the moveable and static components of the turbine engine resulting from expansion and contractions associated with heat generated during the operation of turbine 10.

In general, this written description uses examples to disclose the invention, including the best mode, and also to enable any person skilled in the art to practice the invention, including making and using any devices or systems and performing any incorporated methods. The patentable scope of the invention is defined by the claims, and may be includes other examples that occur to those skilled in the art. Such other examples are intended to be within the scope of the present invention if they have structural elements that do not differ from the literal language of the claims, or if they include equivalent structural elements with insubstantial differences from the literal language of the claims.

The invention claimed is:

1. A turbine comprising:
   a static member;
   a moveable member fluidly connected to the static member; and
   a flexible seal including a spring component having a base section and a plurality of biasing members, the spring component is mounted to one of the static member and the moveable member of the turbine, each of the plurality of biasing members having a first portion extending from the base section and a cantilevered portion, and a seal component provided on the cantilevered portion of the plurality of biasing members, the seal component being biased into contact with the other of the static member and the moveable member.

2. The turbine according to claim 1, wherein the static member is a turbine portion of the turbine and the moveable member is a transition duct, the turbine portion including a combustion gas receiving zone and the transition duct including a first end section and a second end section connected at the combustion gas receiving zone of the turbine portion, the transition duct including an outer surface and an inner surface.

3. The turbine according to claim 2, wherein the flexible seal is mounted to the outer surface of the transition duct at the second end section.

4. The turbine according to claim 3, wherein the base section is mounted to the outer surface of the transition duct at the second end section through a metallurgical bond.

5. The turbine according to claim 2, wherein the static member includes a main body portion and a flange member, the flange member defining an opening leading into the combustion gas receiving zone of the turbine portion.

6. The turbine according to claim 5, wherein the flexible seal is mounted to the flange member.

7. The turbine according to claim 6, wherein the base section of the flexible seal is mounted to the flange member.

8. The turbine according to claim 6, wherein the transition duct includes an extended element extending circumferentially about the outer surface proximate to the second end, the flexible seal abutting the extended element to provide a seal.

9. The turbine according to claim 8, wherein the extended element is a hook.

10. The turbine according to claim 1, wherein the spring component is a double layer leaf spring component.

11. The turbine according to claim 1, wherein the seal component comprises a braided rope.

12. The turbine according to claim 11, wherein the braided rope is arranged in a zigzag configuration, the zigzag configuration enabling the braided rope to expand and contract due to thermal expansions and contractions of the transition duct.

13. The turbine according to claim 1, wherein the seal component is biased into contact with the other of the static member and the moveable member by a force provided by the biasing members and a pressure differential between gases flowing through the turbine.

14. The turbine according to claim 1, wherein the spring component includes a first leaf spring component layer and a second leaf spring component layer, the plurality of biasing members being provided in only one of the first and second leaf spring layers.

15. A flexible seal for a turbine comprising:
   a spring component having a base section mounted to one of a static member and a moveable member of the turbine and a plurality of biasing members, each of the plurality of biasing members having a first portion extending from the base section and a cantilevered portion; and
   a seal component provided on the cantilevered portion of the plurality of biasing members.

16. The flexible seal according to claim 15, wherein the spring component is a multi-layer leaf spring including a first leaf spring layer and a second leaf spring layer, each of the first and second leaf spring layers includes a corresponding base section and a corresponding plurality of biasing members.

17. The flexible seal according to claim 16, wherein the base section of the first leaf spring layer is joined to the base section of the second leaf spring layer to form a laminated flexible spring member.

18. The flexible seal according to claim 15, wherein the seal component comprises a braided rope.

19. The flexible seal according to claim 18, wherein the braided rope is arranged in a zigzag configuration, the zigzag configuration enabling the braided rope to expand and contract due to thermal expansions and contractions of the transition duct.

20. The flexible seal according to claim 15, wherein the spring component includes a first leaf spring component layer and a second leaf spring component layer, the plurality of biasing members being provided in only one of the first and second leaf spring layers.

* * * * *